US009576752B2

(12) United States Patent
Huang et al.

(10) Patent No.: US 9,576,752 B2
(45) Date of Patent: Feb. 21, 2017

(54) CLUTCH MECHANISM FOR ENERGY STORAGE DEVICE AND GAS INSULATED CIRCUIT BREAKER THEREOF

(71) Applicant: Siemens Aktiengesellschaft, München (DE)

(72) Inventors: Guo Qiang Huang, Guangzhou (CN); Gunnar Lutzke, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/904,713

(22) PCT Filed: Oct. 30, 2014

(86) PCT No.: PCT/EP2014/073322
§ 371 (c)(1),
(2) Date: Jan. 13, 2016

(87) PCT Pub. No.: WO2015/063207
PCT Pub. Date: May 7, 2015

(65) Prior Publication Data
US 2016/0240330 A1    Aug. 18, 2016

(30) Foreign Application Priority Data
Oct. 31, 2013    (CN) .......................... 2013 1 0533283

(51) Int. Cl.
*H01H 3/40*    (2006.01)
*H01H 3/30*    (2006.01)
(Continued)

(52) U.S. Cl.
CPC ........... *H01H 3/3005* (2013.01); *F16D 11/16* (2013.01); *F16D 23/12* (2013.01); *H01H 3/30* (2013.01);
(Continued)

(58) Field of Classification Search
CPC ...... H01H 3/30; H01H 3/3005; H01H 3/3031; H01H 3/56; H01H 2003/3078; H01H 2003/3084; H01H 2003/3089
(Continued)

(56) References Cited

U.S. PATENT DOCUMENTS

| 5,723,836 A | 3/1998 | Okuno et al. |
| 6,967,302 B2 * | 11/2005 | Peter .................... H01H 3/3021 192/66.1 |

(Continued)

FOREIGN PATENT DOCUMENTS

| CN | 102867663 A | 1/2013 |
| DE | 19642031 A1 | 4/1997 |
| KR | 100841649 B1 | 6/2008 |

OTHER PUBLICATIONS

International Search Report PCT/ISA/210 for International Application No. PCT/EP2014/073322 dated Jan. 19, 2015.
(Continued)

*Primary Examiner* — Vanessa Girardi
(74) *Attorney, Agent, or Firm* — Harness, Dickey & Pierce, P.L.C.

(57) ABSTRACT

The present application relates to a clutch mechanism for an energy storage device including a load gear, a drive gear, a one-way bearing, a bushing, and a gear shaft including a gear portion and a clutch portion. The gear shaft includes multiple cylinders, and a push rod, a rotary sleeve and an elastic element located in a cavity of the gear shaft. The push rod includes a push rod slide hole and a push rod connecting hole, for connecting to the gear shaft and the rotary sleeve, respectively. A press block is fixed to the drive gear, the press block being capable of pushing the push rod to slide axially, so as to unlock or lock the bushing and the gear shaft. A gas insulated circuit breaker using such a clutch mechanism is also disclosed.

20 Claims, 7 Drawing Sheets

(51) Int. Cl.
*H01H 33/28* (2006.01)
*F16D 11/16* (2006.01)
*H01H 33/64* (2006.01)
*F16D 23/12* (2006.01)

(52) U.S. Cl.
CPC ............ H01H 33/28 (2013.01); H01H 33/64 (2013.01); *F16D 2023/123* (2013.01); *F16D 2300/24* (2013.01); *H01H 2003/3089* (2013.01)

(58) Field of Classification Search
USPC .............................. 200/501, 400; 335/74, 76
See application file for complete search history.

(56) References Cited

U.S. PATENT DOCUMENTS

| 9,431,186 B2* | 8/2016 | Deng | H01H 3/3031 |
| 2016/0148760 A1* | 5/2016 | Huang | H01H 3/3021 |
| | | | 200/501 |

OTHER PUBLICATIONS

Written Opinion of the International Searching Authority PCT/ISA/237 for International Application No. PCT/EP2014/073322 dated Jan. 19, 2015.

* cited by examiner

CLUTCH MECHANISM FOR ENERGY STORAGE DEVICE AND GAS INSULATED CIRCUIT BREAKER THEREOF

PRIORITY STATEMENT

This application is the national phase under 35 U.S.C. §371 of PCT International Application No. PCT/EP2014/073322 which has an International filing date of Oct. 30, 2014, which designated the United States of America and which claims priority to Chinese patent application number CN 201310533283.1 filed Oct. 31, 2013, the entire contents of which are hereby incorporated herein by reference.

FIELD

The present application generally relates to a clutch mechanism, in particular to a clutch mechanism for an energy storage device. In addition, the present application also generally relates to a gas insulated circuit breaker using such a clutch mechanism.

BACKGROUND ART

Many types of energy storage devices need to work in cooperation with a clutch mechanism, in order to accumulate energy and release energy when required. These energy storage devices may for example rely on springs to accumulate potential energy, and when accumulation of energy is complete, a clutch mechanism can be put into an unlocked state to release energy.

Many existing gas insulated circuit breakers for high voltage power transmission employ an energy storage device and a clutch mechanism cooperating therewith; when in a locked state, the clutch mechanism enables the energy storage device to accumulate and store energy. When the clutch mechanism is in an unlocked state, a motive power device separates mechanically from the energy storage device, thereby allowing the energy accumulated in the energy storage device to be released, so that the potential energy stored in the energy storage device is converted to kinetic energy, to drive an actuating mechanism in the gas insulated circuit breaker to open or close the circuit in which the gas insulated circuit breaker is connected. An existing type of clutch mechanism takes the form of a ratchet mechanism, in which a ratchet and a pawl cooperate with one another; in the locked state, the ratchet can only rotate in one direction as energy is accumulated, so that the accumulated energy will not be lost. When energy accumulation by the energy storage device is complete, the pawl will achieve mechanical separation of the motive power device from the energy storage device with an arcuate surface on the ratchet, and release energy when required.

South Korean patent KR100841649B1 has disclosed a switch cabinet trolley for medium voltage power distribution, wherein a clutch mechanism is used to enable switching between two different modes, namely operation of the trolley by hand or by electricity. The clutch mechanism comprises a driving gear, a driven gear and a lead screw, wherein a switching unit can transfer driven gear torque to the lead screw or cut off transfer of driven gear torque to the lead screw. The switching unit comprises a clutch rod provided in a handle insertion hole, a clutch ball provided in a ball insertion hole, and an elastic component.

SUMMARY

An embodiment of the present invention provides a clutch mechanism for an energy storage device, comprising a load gear, a drive gear, a one-way bearing, a bushing and a gear shaft comprising a gear portion and a clutch portion, wherein the load gear is connected coaxially to the bushing via the one-way bearing so as to be rotatable in a single direction, the bushing is connected coaxially to the clutch portion so as to be rotatable in two directions, and the drive gear is externally meshed with the gear portion. The gear shaft comprises multiple cylinders, and a push rod and an elastic element located in a cavity of the gear shaft, wherein the clutch portion has multiple holes corresponding to the cylinders, with the cylinders being located in the holes. At the junction of the gear portion and the clutch portion there is a gear shaft connecting hole. The rotary sleeve has two rotary sleeve slide holes which extend spirally in an axial direction, and has multiple sleeve slots corresponding to the cylinders, the two rotary sleeve slide holes being centrosymmetric around the axis of the rotary sleeve, and an inside wall of the bushing having multiple bushing slots corresponding to the cylinders. The push rod comprises a push rod slide hole and a push rod connecting hole and can slide axially, wherein one end of the push rod passes through the rotary sleeve and presses the elastic element, and the push rod is connected to the gear shaft by a guide pin which passes through the slide hole and the gear shaft connecting hole, and connected to the rotary sleeve by another guide pin which passes through the push rod connecting hole and the two rotary sleeve slide holes. A press block is fixed to the drive gear, the press block being capable of contacting the other end of the push rod and pushing the push rod to slide axially. When the press block pushes the push rod, the cylinders are released so as to unlock the bushing from the gear shaft. When the press block leaves the push rod, the cylinders are clamped between the rotary sleeve and the bushing so as to lock the bushing to the gear shaft. The clutch mechanism of the present invention enables simple and reliable mechanical separation of a motive power device and an energy storage device once energy storage is complete at a relatively low cost.

An embodiment of the present invention also provides a gas insulated circuit breaker, comprising a motive power device, an actuating device, an energy storage device and the clutch mechanism as claimed in any of the above claims, wherein the load gear is connected to the motive power device, the drive gear is connected to the energy storage device, and the gear shaft is connected to the actuating device. The gas insulated circuit breaker of the present invention enables simple and reliable mechanical separation of the motive power device and the energy storage device once energy storage is complete at a relatively low cost.

Preferred embodiments are explained below in an easy to understand way with reference to the accompanying drawings, in order to illustrate further the abovementioned characteristics, technical features and advantages of the present invention as well as ways in which it may be implemented.

BRIEF DESCRIPTION OF THE DRAWINGS

The accompanying drawings listed below are merely intended to illustrate and explain the present invention schematically, not to define the scope thereof.

| Key to main device labels | | | |
|---|---|---|---|
| 21 | push rod | 25 | load gear |
| 211 | push rod slide hole | 212 | push rod connecting hole |
| 22 | drive gear | 26 | press block |
| 23 | one-way bearing | 261 | sloping face |
| 24 | gear shaft | 27 | cylinder |
| 241 | gear portion | 242 | clutch portion |
| 243 | gear shaft connecting hole | 244 | hole |
| 28 | bushing | 20 | elastic element |
| 29 | needle roller bearing | 31 | rotary sleeve |
| 311, 312 | rotary sleeve slide hole | 313 | sleeve slot |
| 32, 33 | guide pin | 271, 272 | stop |
| 281 | bushing slot | | |

DETAILED DESCRIPTION OF THE EXAMPLE EMBODIMENTS

An embodiment of the present invention provides a clutch mechanism for an energy storage device, comprising a load gear, a drive gear, a one-way bearing, a bushing and a gear shaft comprising a gear portion and a clutch portion, wherein the load gear is connected coaxially to the bushing via the one-way bearing so as to be rotatable in a single direction, the bushing is connected coaxially to the clutch portion so as to be rotatable in two directions, and the drive gear is externally meshed with the gear portion. The gear shaft comprises multiple cylinders, and a push rod and an elastic element located in a cavity of the gear shaft, wherein the clutch portion has multiple holes corresponding to the cylinders, with the cylinders being located in the holes. At the junction of the gear portion and the clutch portion there is a gear shaft connecting hole. The rotary sleeve has two rotary sleeve slide holes which extend spirally in an axial direction, and has multiple sleeve slots corresponding to the cylinders, the two rotary sleeve slide holes being centro-symmetric around the axis of the rotary sleeve, and an inside wall of the bushing having multiple bushing slots corresponding to the cylinders. The push rod comprises a push rod slide hole and a push rod connecting hole and can slide axially, wherein one end of the push rod passes through the rotary sleeve and presses the elastic element, and the push rod is connected to the gear shaft by a guide pin which passes through the slide hole and the gear shaft connecting hole, and connected to the rotary sleeve by another guide pin which passes through the push rod connecting hole and the two rotary sleeve slide holes. A press block is fixed to the drive gear, the press block being capable of contacting the other end of the push rod and pushing the push rod to slide axially. When the press block pushes the push rod, the cylinders are released so as to unlock the bushing from the gear shaft. When the press block leaves the push rod, the cylinders are clamped between the rotary sleeve and the bushing so as to lock the bushing to the gear shaft. The clutch mechanism of the present invention enables simple and reliable mechanical separation of a motive power device and an energy storage device once energy storage is complete at a relatively low cost.

According to one aspect of an embodiment of the present invention, the bushing is connected coaxially to the clutch portion via a deep-groove ball bearing or a needle roller bearing so as to be rotatable in two directions.

According to another aspect of an embodiment of the present invention, the elastic element is a spring.

According to another aspect of an embodiment of the present invention, the press block comprises a sloping face capable of contacting the push rod. The sloping face facilitates smooth contact between the press block and the push rod.

According to another aspect of an embodiment of the present invention, the cylinders are held in the multiple corresponding holes by stops. The stops can prevent axial movement of the cylinders in the holes of the gear shaft.

According to another aspect of an embodiment of the present invention, the shape of the bushing slots is adapted to the shape of the cylinders. Having the shape of the bushing slots adapted to the shape of the cylinders allows a better clutch effect to be achieved.

According to another aspect of an embodiment of the present invention, there is one said deep-groove ball bearing or needle roller bearing at each of the two ends of the bushing in the axial direction, with the cylinders being located between the deep-groove ball bearings or needle roller bearings in the axial direction. Providing a bearing at each of the two ends helps to ensure coaxiality between the gear shaft and bushing.

An embodiment of the present invention also provides a gas insulated circuit breaker, comprising a motive power device, an actuating device, an energy storage device and the clutch mechanism as claimed in any of the above claims, wherein the load gear is connected to the motive power device, the drive gear is connected to the energy storage device, and the gear shaft is connected to the actuating device. The gas insulated circuit breaker of the present invention enables simple and reliable mechanical separation of the motive power device and the energy storage device once energy storage is complete at a relatively low cost.

Preferred embodiments are explained below in an easy to understand way with reference to the accompanying drawings, in order to illustrate further the abovementioned characteristics, technical features and advantages of the present invention as well as ways in which it may be implemented.

Particular embodiments of the present invention are now described with reference to the accompanying drawings, to furnish a clearer understanding of the technical features, object and effects of the present invention. In the drawings, identical labels indicate identical components or components with similar structures but the same function; in the case of components with the same structure or function, only one of these is drawn schematically, or only one of these is labeled. So that the drawings may appear uncluttered, only those components relevant to the present invention are shown schematically, but these by no means represent the actual structure of the invention as a product. In this text, "connection" means a direct "connection", or a "connection" via a third component.

Figure 4:
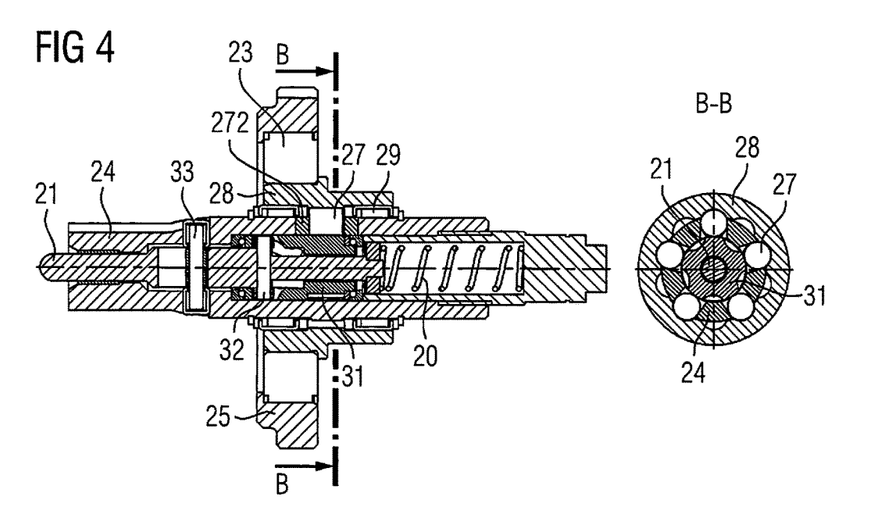
FIG. 4 shows schematically an axial sectional view and a radial sectional view B-B of the load gear and gear shaft of FIG. 3 when in the locked state of FIG. 1.
Figure 5:
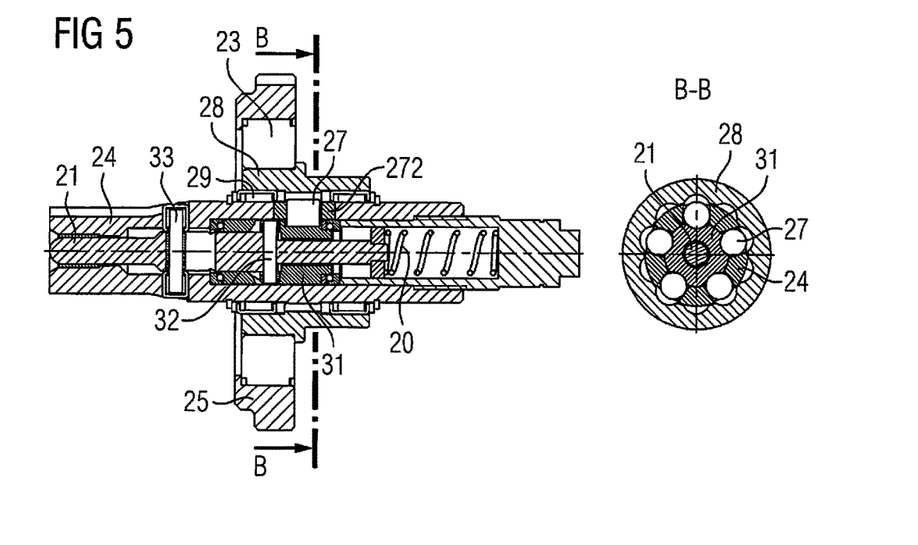
FIG. 5 shows schematically an axial sectional view and a radial sectional view B-B of the load gear and gear shaft of FIG. 3 when in the unlocked state of FIG. 2.
Figure 6:
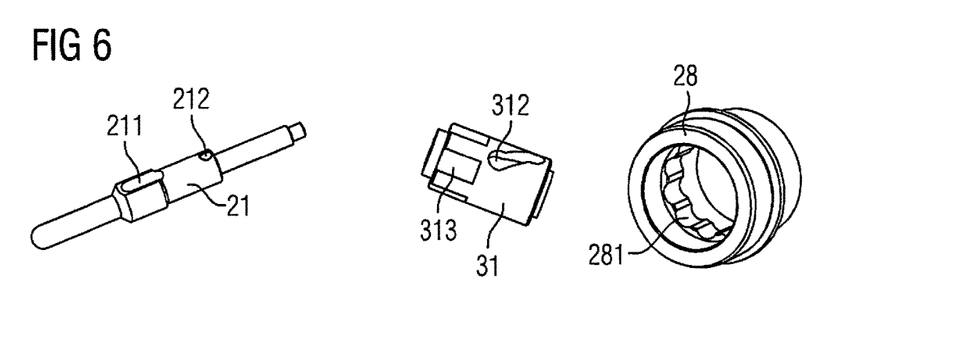
FIG. 6 shows schematically a perspective view of the push rod, rotary sleeve and bushing of FIG. 3.
Figure 7:
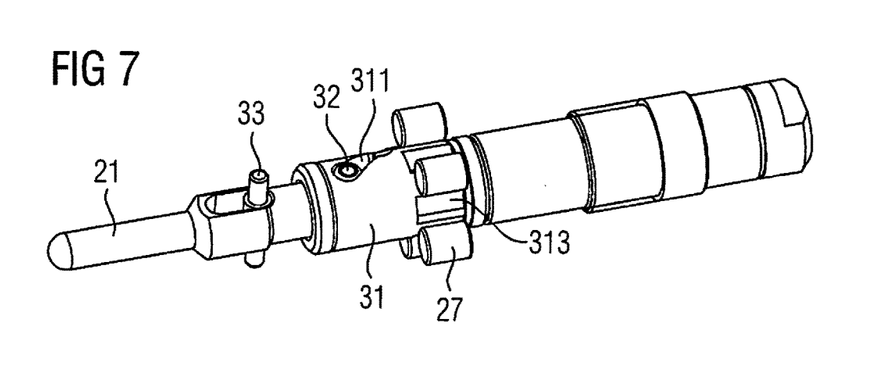
FIG. 7 shows schematically a perspective view of the push rod, rotary sleeve, guide pin and cylinder after assembly.
Figure 8:
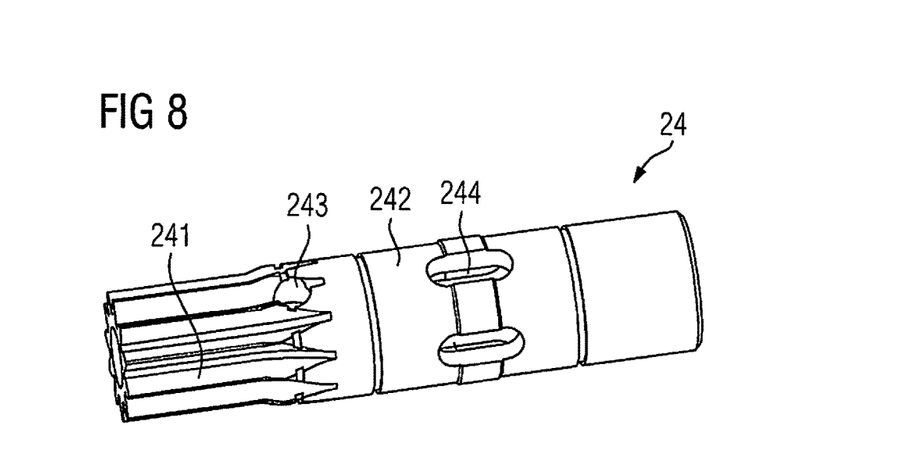
FIG. 8 shows schematically a perspective view of the gear shaft.
Figure 9:
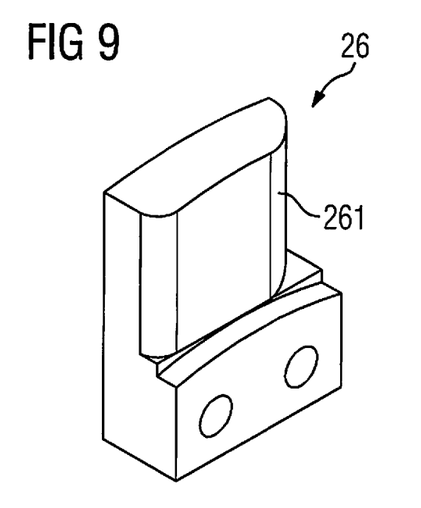
FIG. 9 shows schematically the press block with a sloping face.
Figure 10:
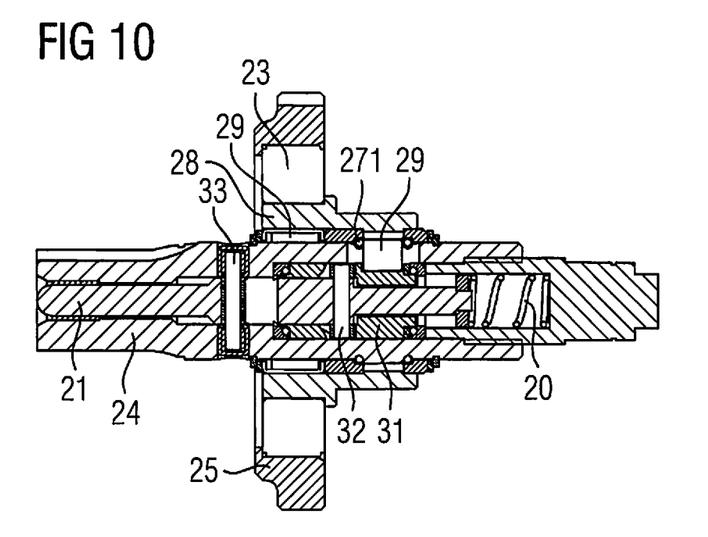
FIG. 10 shows schematically a sectional view of another embodiment of the present invention.
Figure 11:
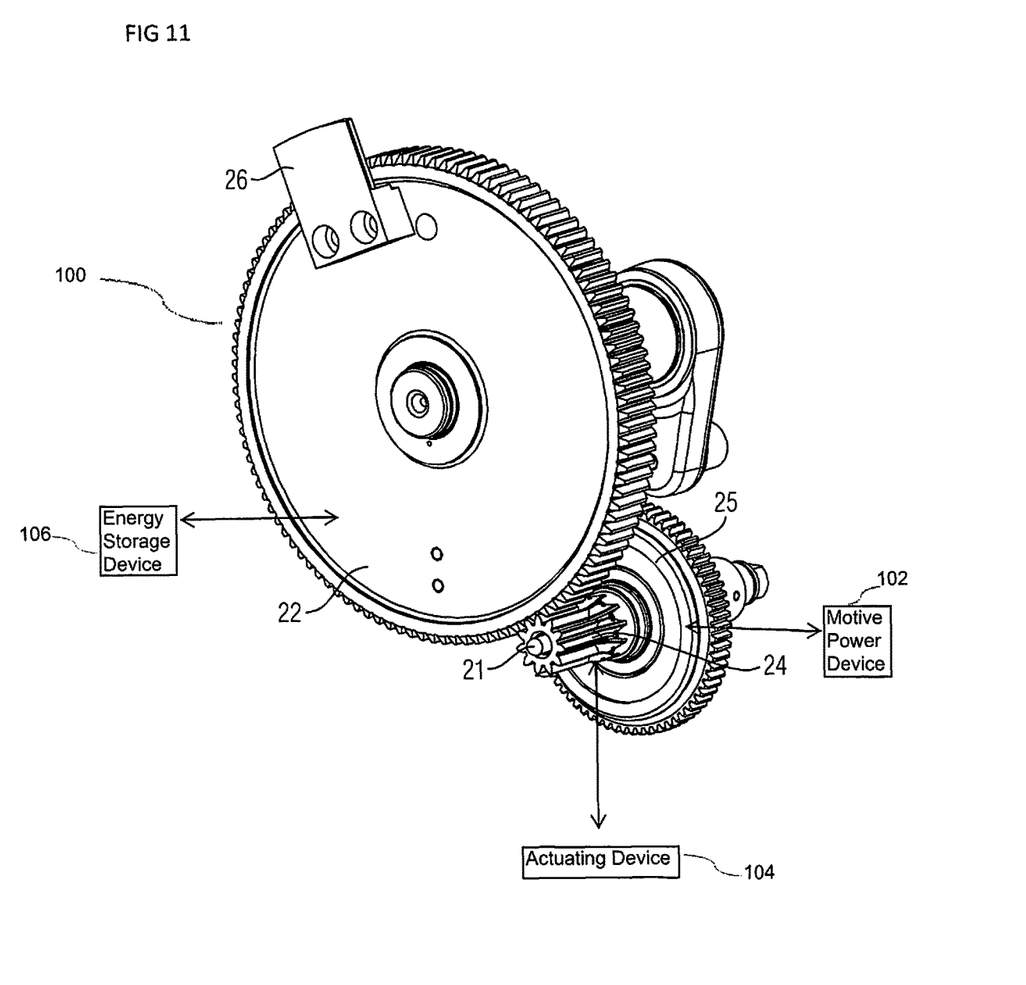
FIG. 11 shows schematically the gas insulated circuit breaker.

As shown in FIGS. 1 to 5, a clutch mechanism for an energy storage device comprises a load gear 25, a drive gear 22, a one-way bearing 23, a bushing 28 and a gear shaft 24 comprising a gear portion 241 and a clutch portion 242, wherein the load gear 25 is connected coaxially to the bushing 28 via the one-way bearing 23 so as to be rotatable in a single direction, while the bushing 28 is connected coaxially to the clutch portion 242 so as to be rotatable in two directions. The drive gear 22 is externally meshed with the gear portion 241. The gear shaft 24 comprises multiple cylinders 27, and a push rod 21 and an elastic element 20 located in a cavity of the gear shaft 24, wherein the clutch portion 242 has multiple holes 244 corresponding to the cylinders 27, with the cylinders 27 being located in the holes 244. Preferably, the cylinders 27 are retained in the corresponding multiple holes 244 by stops, to prevent axial movement of the cylinders 27 in the holes 244 of the gear shaft 24, wherein, in one embodiment of the present invention which is shown in FIGS. 1 to 9, keys 272 which mate with the cylinders 27 are used to limit the position of the cylinders 27 in the holes 244, whereas in another embodiment of the present invention which is shown in FIG. 10, retaining rings 271 are used to limit the position of the cylinders 27 in the holes 244. At the junction of the gear portion 241 and clutch portion 242, there is a gear shaft connecting hole 243 as shown in FIG. 8, for example two gear shaft connecting holes 243 which are symmetric along the axis, as shown in FIGS. 4 and 5. In the present invention, the "junction" of the gear portion 241 and clutch portion 242 does not only refer to the boundary line between the two, but also includes positions close to the boundary line. Those skilled in the art will understand that the number of cylinders 27 may be increased or decreased as required, and is not limited to five as in the embodiments shown in the figures, as long as the number can meet the design requirements. In the present invention, "axial direction" and "radial direction" refer to the directions of each component relative to the axis of the gear shaft 24 after assembly of the clutch mechanism is complete.

A rotary sleeve 31 has two rotary sleeve slide holes 311 and 312 which extend spirally in an axial direction, and also has multiple sleeve slots 313 corresponding to the cylinders 27. An inside wall of the bushing 28 has multiple bushing slots 281 corresponding to the cylinders 27, the bushing slots 281 preferably having a shape adapted to that of the cylinders 27; for example, as shown in FIGS. 4 and 5, the bushing slots 281 have the same curvature as the cylinders 27, to achieve a better clutch effect. As shown in FIGS. 6 and 7, the two rotary sleeve slide holes 311 and 312 are centrosymmetric around the axis of the rotary sleeve 31. The push rod 21 comprises a push rod slide hole 211 and a push rod connecting hole 212 and can slide axially, wherein one end of the push rod 21 passes through the rotary sleeve 31 and presses the elastic element 20. The push rod 21 is connected to the gear shaft 24 by a guide pin 33 which passes through the push rod slide hole 211 and the gear shaft connecting hole 243, and connected to the rotary sleeve 31 by a guide pin 32 which passes through the push rod connecting hole 212 and two rotary sleeve slide holes 311 and 312. A press block 26 is fixed to the drive gear 22, the press block 26 being capable of contacting the other end of the push rod 21 and pushing the push rod 21 to slide axially.

The centrosymmetric rotary sleeve slide holes 311 and 312 ensure that the rotary sleeve 31 will rotate when guide pin moves axially in a straight line, so as to lift the cylinders 27 and clamp them between the rotary sleeve 31 and the bushing 28 as shown in sectional view B-B in FIG. 4, or move the cylinders 27 into the sleeve slots 313 in order to release the rotary sleeve 31 from the bushing 28 as shown in sectional view B-B in FIG. 5. When the press block 26 leaves the push rod 21, guide pin 32 connected to the push rod 21 slides axially, pushed by the elastic element 20; due to the push rod slide hole 211, the push rod 21 is restricted by guide pin 33 connected to the gear shaft 24 and so cannot rotate relative to the gear shaft 24, therefore guide pin 32 too can only move in a straight line. At this time, the two spirally extending rotary sleeve slide holes 311 will rotate as guide pin 32 moves in a straight line, moving the cylinders 27 outwards radially, so as to be clamped between the rotary sleeve 31 and the bushing 28, until guide pin 33 reaches one limit position of the push rod slide hole 211 as shown in FIG. 4, at which point the rotary sleeve 31 can no longer rotate relative to the push rod 21, so that the bushing 28 and gear shaft 24 can also not rotate relative to each other and are therefore locked together. When the press block 26 pushes the push rod 21, guide pin 32 connected to the push rod 21 moves axially in a straight line, pushed by the press block 26, so that the rotary sleeve 31 rotates in the opposite direction to that when the press block 26 leaves the push rod 21, thereby causing the cylinders 27 to break contact with the bushing 28 and enter the sleeve slots 313, until guide pin 33 reaches the other limit position of the push rod slide hole 211 as shown in FIG. 5, at which point the rotary sleeve 31 can no longer rotate relative to the push rod 21. At this time, the rotary sleeve 31 and bushing 28 can rotate relative to each other, so the bushing 28 and gear shaft 24 can also rotate relative to each other and thus are unlocked from each other.

Those skilled in the art will also understand that the transmission ratio between the drive gear 22 and gear portion 241 may be selected according to actual parameters of various kinds of a motive power device, actuating device and energy storage device, while the length of the spirally extending rotary sleeve slide holes 311 and 312 as well as the curvature thereof may be determined according to the separation of the sleeve slots 313 in the rotary sleeve 31. Those skilled in the art will also understand that although the bushing 28 is connected coaxially to the clutch portion 242 by a deep-groove ball bearing or needle roller bearing 29 so as to be rotatable in two directions in the embodiment shown in FIGS. 1 to 9, the bushing 28 may also be connected directly with no bearing or by a sliding bearing; it is also possible to have a deep-groove ball bearing or a needle roller bearing 29 at each of the two ends of the bushing 28 in the axial direction, as in the embodiment shown in FIG. 10, with the cylinders 27 being located between the two deep-groove ball bearings or needle roller bearings 29 in the axial direction. Providing a bearing at each of the two ends helps to ensure coaxiality between the gear shaft and bushing. The load gear 25 shown in the figures is connected coaxially to one bushing 28 by a one-way bearing 23 so as to be rotatable in a single direction. The elastic element 20 is preferably a spring, but may also be another element capable of engaging with and pressing the push rod 21. As FIG. 9 shows, the press block 26 comprises a sloping face 261 capable of contacting the push rod 21, to facilitate smooth contact between the press block 26 and push rod 21.

According to one embodiment which is not shown, the gas insulated circuit breaker 100 of the present invention comprises a motive power device 102, an actuating device 104, an energy storage device 106 and the clutch mechanism described above, wherein the load gear 25 is connected to the motive power device, the drive gear 22 is connected to the energy storage device, and the gear shaft 24 is connected to the actuating device. When energy accumulated in the energy storage device has been released, the clutch mechanism is in the locked position shown in FIGS. 1 and 4; the elastic element 20 is engaged with one end of the push rod 21 and presses the push rod 21, so that the push rod 21 bears against an inside wall of the cavity of the gear shaft 24. During this process, guide pin 32 slides axially. Since the two rotary sleeve slide holes 311 and 312 of the rotary sleeve 31 extend spirally, while guide pin 32 projects into the two rotary sleeve slide holes 311 and 312, the rotary sleeve 31 will rotate around the axis and the cylinders 27 simultaneously contact the inside of the bushing 28 and the outside of the rotary sleeve 31 as shown in sectional view B-B in FIG. 4, thereby locking the bushing 28 and gear shaft 24 together, so that relative rotation therebetween is not possible. At this time, using a motive power source such as an electric motor to turn the load gear 25 will turn the gear shaft 24 in synchrony, so as to convert kinetic energy to potential energy in the energy storage device connected to the drive gear 22, wherein the one-way bearing 23 ensures that the energy stored will not be released during loading. At the same time, the drive gear 22 will also rotate in synchrony due to being meshed with the gear portion 241, while the press block 26 will also rotate in synchrony due to being fixed to the drive gear 22.

Figure 1:
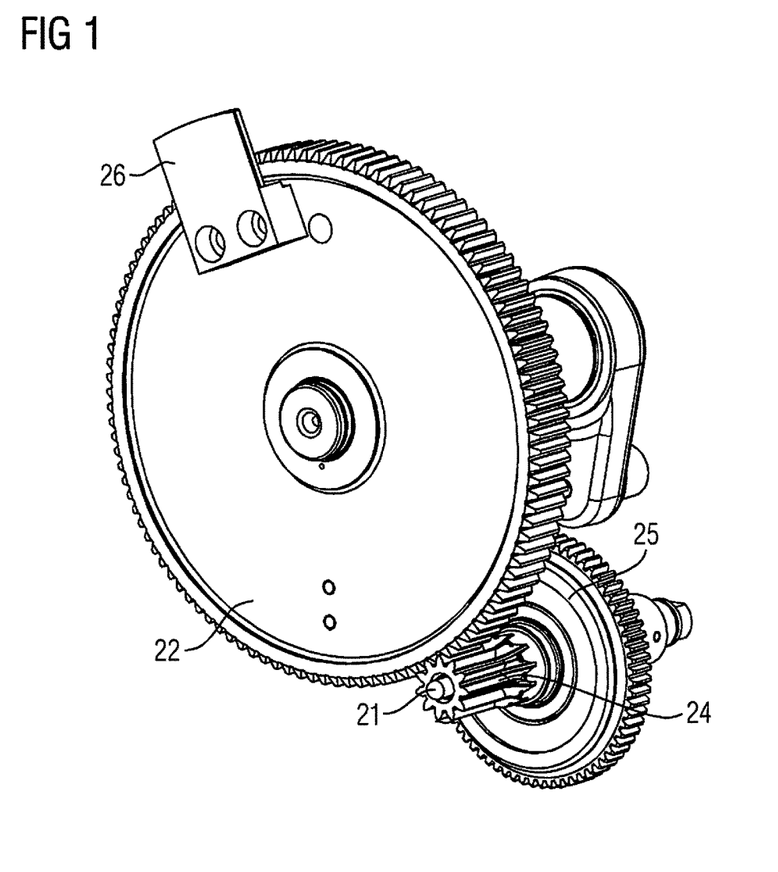
FIG. 1 shows schematically a perspective view of the clutch mechanism of an embodiment of the present invention after the energy storage device has been released.
Figure 2:
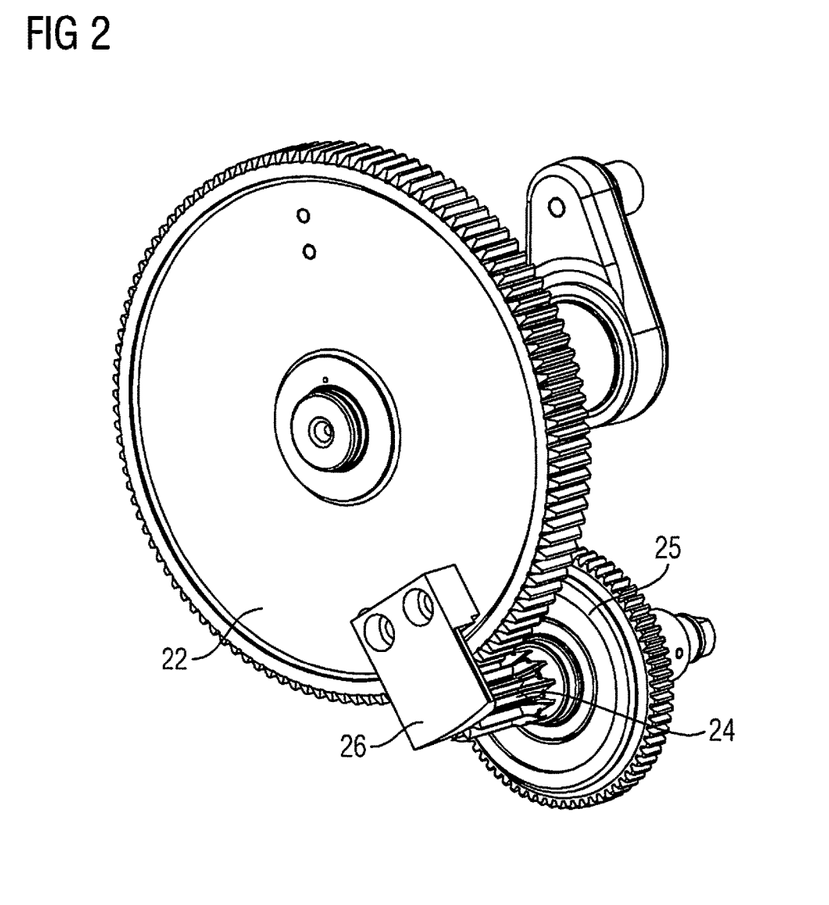
FIG. 2 shows schematically a perspective view of the clutch mechanism of an embodiment of the present invention at the instant of release of the energy storage device or when the accumulation of energy therein is complete.
Figure 3:
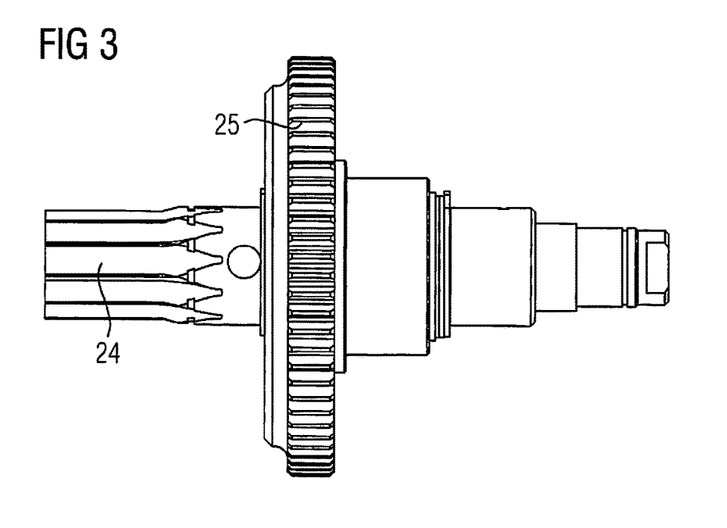
FIG. 3 shows schematically a perspective view of the load gear and gear shaft connected to each other.

When storage of energy is complete, i.e. when the press block 26 turns to the unlocked position of the clutch mechanism shown in FIGS. 2 and 5, the sloping face 261 will push the push rod 21, so that the push rod 21 presses the elastic element 20 as shown in FIG. 5 such that the cylinders 27 enter the sleeve slots 313 in the rotary sleeve 31, thereby causing the cylinders 27 to break contact with the bushing 28 as shown in sectional view B-B in FIG. 5, and in turn enabling the energy storage device to separate mechanically from the load gear 25. At this time, an operation to release the stored energy may be carried out. During the release of energy, the drive gear 22 and press block 26 rotate in synchrony, and the drive gear 22 will turn the gear shaft 24. Once the press block 26 fixed to the drive gear 22 has turned through a suitable angle, the press block 26 will leave the push rod 21, at which time the push rod 21 will reset at a suitable position under the action of the elastic element 20. At the same time, the rotary sleeve 31 will rotate, thereby pushing the cylinders 27 into contact with the bushing 28 again.

After the resetting, the gear shaft 24 continues to rotate and will turn the one-way bearing 23 coaxially, until all of the energy has been released, finally prompting closure of the circuit by the actuating device. Those skilled in the art will understand that the dimensions of the press block 26 and the position at which it is fixed to the drive gear 22 may be selected according to the requirements of the design parameters. The clutch mechanism and gas insulated circuit breaker thereof according to the present invention enable simple and reliable mechanical separation of the motive power device and the energy storage device once energy storage is complete at a relatively low cost.

It should be understood that although the description provided herein is based on various embodiments, it is by no means the case that each embodiment only includes one independent technical solution. Such a method of presentation is adopted herein purely for the sake of clarity. Those skilled in the art should consider the description in its entirety; the technical solutions of different embodiments may also be suitably combined to form other embodiments capable of being understood by those skilled in the art.

In this text, the term "schematic" means "serving as a real instance, example or illustration". No drawing or embodiment described herein as "schematic" should be interpreted as a more preferable or more advantageous technical solution.

The above embodiments are merely particular schematic embodiments of the present invention, which are not intended to define the scope thereof. Any equivalent changes, amendments or combinations made by those skilled in the art without deviating from the concept and principles of the present invention should fall within the scope of protection thereof.

The invention claimed is:

1. A clutch mechanism for an energy storage device, comprising:
   a load gear;
   a drive gear;
   a one-way bearing;
   a bushing;
   a gear shaft including a gear portion and a clutch portion, the load gear being connected coaxially to the bushing via the one-way bearing so as to be rotatable in a single direction, the bushing being connected coaxially to the clutch portion so as to be rotatable in two directions, and the drive gear being externally meshed with the gear portion;
   the gear shaft including multiple cylinders, and including a push rod, a rotary sleeve and an elastic element located in a cavity of the gear shaft, wherein the clutch portion includes multiple holes corresponding to the cylinders, the cylinders being located in the holes, and wherein, at a junction of the gear portion and the clutch portion, a gear shaft connecting hole is present;
   the rotary sleeve including two rotary sleeve slide holes extending spirally in an axial direction, and including multiple sleeve slots corresponding to the cylinders, the two rotary sleeve slide holes being centrosymmetric around the axis of the rotary sleeve, and an inside wall of the bushing including multiple bushing slots corresponding to the cylinders;
   the push rod including a push rod slide hole and a push rod connecting hole and is slideable axially, wherein one end of the push rod is configured to pass through the rotary sleeve and press the elastic element, and the push rod is connected to the gear shaft by a guide pin, configured to pass through the push rod slide hole and the gear shaft connecting hole, and is connected to the rotary sleeve by another guide pin configured to pass through the push rod connecting hole and the two rotary sleeve slide holes; and
   a press block, fixed to the drive gear, the press block being configured to contact the other end of the push rod and pushing the push rod to slide axially; wherein
   when the press block pushes the push rod, the cylinders are configured to be released so as to unlock the bushing from the gear shaft, and when the press block leaves the push rod, the cylinders are configured to be clamped between the rotary sleeve and the bushing so as to lock the bushing to the gear shaft.

2. A gas insulated circuit breaker, comprising:
   a motive power device;
   an actuating device;
   an energy storage device; and the clutch mechanism of claim 1, wherein the load gear is connected to the motive power device, the drive gear is connected to the energy storage device, and the gear shaft is connected to the actuating device.

3. The clutch mechanism of claim 1, wherein the shape of the bushing slots is adapted to the shape of the cylinders.

4. The clutch mechanism of claim 1, wherein the cylinders are held in the multiple corresponding holes of the clutch portion by stops.

5. The clutch mechanism of claim 1, wherein the press block includes a sloping face configured to contact the push rod.

6. A gas insulated circuit breaker, comprising:
a motive power device;
an actuating device;
an energy storage device; and
the clutch mechanism of claim 5, wherein the load gear is connected to the motive power device, the drive gear is connected to the energy storage device, and the gear shaft is connected to the actuating device.

7. The clutch mechanism of claim 1, wherein the elastic element is a spring.

8. A gas insulated circuit breaker, comprising:
a motive power device;
an actuating device;
an energy storage device; and
the clutch mechanism of claim 7, wherein the load gear is connected to the motive power device, the drive gear is connected to the energy storage device, and the gear shaft is connected to the actuating device.

9. The clutch mechanism of claim 1, wherein the bushing is connected coaxially to the clutch portion via a deep-groove ball bearing or a needle roller bearing so as to be rotatable in two directions.

10. The clutch mechanism of claim 9, wherein the elastic element is a spring.

11. The clutch mechanism of claim 9, wherein the press block includes a sloping face configured to contact the push rod.

12. The clutch mechanism of claim 9, wherein the cylinders are held in the multiple corresponding holes of the clutch portion by stops.

13. The clutch mechanism of claim 9, wherein the shape of the bushing slots is adapted to the shape of the cylinders.

14. A gas insulated circuit breaker, comprising:
a motive power device;
an actuating device;
an energy storage device; and
the clutch mechanism of claim 9, wherein the load gear is connected to the motive power device, the drive gear is connected to the energy storage device, and the gear shaft is connected to the actuating device.

15. The clutch mechanism of claim 9, further comprising one said deep-groove ball bearing or needle roller bearing at each of the two ends of the bushing in the axial direction, with the cylinders being located between the deep-groove ball bearings or needle roller bearings in the axial direction.

16. The clutch mechanism of claim 15, wherein the elastic element is a spring.

17. The clutch mechanism of claim 15, wherein the press block includes a sloping face configured to contact the push rod.

18. The clutch mechanism of claim 15, wherein the cylinders are held in the multiple corresponding holes of the clutch portion by stops.

19. The clutch mechanism of claim 15, wherein the shape of the bushing slots is adapted to the shape of the cylinders.

20. A gas insulated circuit breaker, comprising:
a motive power device;
an actuating device;
an energy storage device; and
the clutch mechanism of claim 15, wherein the load gear is connected to the motive power device, the drive gear is connected to the energy storage device, and the gear shaft is connected to the actuating device.

* * * * *